United States Patent
Haddox

[19]

[11] Patent Number: 6,164,345
[45] Date of Patent: Dec. 26, 2000

[54] FLEXIBLE FLUID CONTAINMENT SYSTEM

[75] Inventor: Robert Haddox, Spring, Tex.

[73] Assignee: Matrix Service, Inc., Tulsa, Okla.

[21] Appl. No.: 09/481,848

[22] Filed: Jan. 14, 2000

[51] Int. Cl.[7] .............................. B65B 1/04; B65B 3/04; B67C 3/02

[52] U.S. Cl. .............................. 141/86; 141/88; 405/52; 137/312; 138/97

[58] Field of Search .................................. 141/84–88, 97, 141/98, 115, 390–392; 137/312, 363; 222/108; 405/52; 422/900; 138/97

[56] References Cited

U.S. PATENT DOCUMENTS

| | | | |
|---|---|---|---|
| 4,579,155 | 4/1986 | Zola | 141/86 |
| 4,883,329 | 11/1989 | Flannery et al. | 312/1 |
| 4,971,477 | 11/1990 | Webb et al. | 405/154 |
| 5,186,577 | 2/1993 | Reicin et al. | 405/52 |
| 5,313,991 | 5/1994 | Murray et al. | 141/86 |
| 5,379,810 | 1/1995 | Marino | 141/10 |
| 5,511,573 | 4/1996 | Corte | 137/15 |
| 5,571,249 | 11/1996 | Boylen | 141/86 |
| 5,623,755 | 4/1997 | Childress et al. | 29/426 |
| 5,647,412 | 7/1997 | Brewer | 141/86 |
| 5,690,138 | 11/1997 | Fuller | 137/312 |
| 5,725,009 | 3/1998 | Mallow, Sr. et al. | 137/15 |
| 5,865,223 | 2/1999 | Cornford | 141/88 |
| 5,882,045 | 3/1999 | Bravo | 285/123 |

Primary Examiner—Henry J. Recla
Assistant Examiner—Timothy L. Maust
Attorney, Agent, or Firm—Head, Johnson & Kachigian

[57] ABSTRACT

A removable containment apparatus for containing pipeline valve seepage comprising a one piece foldable leak proof membrane with an outer edge contoured to form a container about a pipeline valve when said membrane is folded about a midline and over the pipeline valve, said one piece membrane having: a first section on said edge on said membrane which forms an aperture for an in-line to said valve when said membrane is folded, a second section on said edge on said membrane which forms an aperture for an outline from said valve when said membrane is folded, a third section and fourth section on said edge on said membrane which join and form an aperture for a stem on said valve when said membrane is folded, a fifth section and sixth section on said edge of said membrane which join forming a seam between said in-line and said stem, a seventh section and eighth section on said edge of said membrane which join forming a seam between said outline and said stem, means for removably sealing said first section to said in-line, said second section to said outline, said third section and said fourth section to said valve stem, said fifth section and said sixth section to one another, and said seventh section and said eighth section to one another.

13 Claims, 2 Drawing Sheets

FLEXIBLE FLUID CONTAINMENT SYSTEM

BACKGROUND OF THE INVENTION

1. Field of the Invention

The present invention relates to secondary containment apparatus and process to control valve or pipe fitting seepage. More particularly, the present invention is directed to a one piece container which covers a valve or pipe fitting and prevents leaking fluid from the valve or fitting from contaminating the environment. The apparatus can be installed quickly by one or two people over an existing valve assembly without taking the fluid system out of service. The apparatus doesn't interfere with the operation of the valve handle, can easily be removed, and allows for observation and drainage of accumulated seepage from the valve assembly.

2. Description of the Prior Art

In today's environmentally conscious world, contamination of the earth and ground water has impacted all aspects of piping systems that potentially carry such items as industrial chemicals, petroleum products, and even organic waste. It is frequently unacceptable to permit seepage from piping systems, and the valves or fittings associated therewith, to flow to the ground.

The prior art systems and apparatus for secondary containment were generally of two types. The first, and often most costly, is building a reservoir or catch basin under the valve to collect seepage. These prior art systems had to be waterproof, large enough to contain seepage and water accumulation from such weather events as rain, while also having a means to empty the seepage. Installing these systems to conform to strict environmental codes regarding open receptacles containing harmful chemicals that are accessible to wildlife, is often expensive.

The second type of containment systems often seen in the prior art are containers which were integrated into the pipeline while the pipeline and associated valve were installed. These prior art devices often enclosed the entire valve or fitting and made the valve handle inaccessible unless the containment device was completely removed. These systems were often bulky, non-flexible, and required extensive time to assemble and disassemble.

Other containment systems require the fluid system to be taken out of service and the valve disassembled to install.

Furthermore, it is understood that valve wrapping is a common practice in prior art for insulating a valve from freezing or preventing a leak from spraying or shooting out where it could come in contact with people or sensitive equipment. Unfortunately, these prior art wrapping devices didn't prevent seepage from contacting the ground or meet the further objectives of the current invention.

The prior art also fails to provide an apparatus that is inexpensive, easy to assemble and disassemble, provide visible inspection, allow for drainage of seepage, be installed on preexisting valves while in service, and can be installed on pipelines or valves of various diameters.

SUMMARY OF THE INVENTION

In view of the foregoing disadvantages inherent in the known types of secondary containment systems for valves now present in the prior art, the present invention provides new and improved construction wherein the same can be utilized reliably in those situations where a containment apparatus for valve or pipe fitting seepage is desired. As such, the general purpose of the present invention, which will be described subsequently in greater detail, is to provide a new and improved containment apparatus for valve or piping system seepage which has all the advantages of the prior art and none of the disadvantages.

To attain this, the present invention essentially comprises a membrane with an outer edge contoured to form a container around a valve or fitting. The contouring of the membrane generally allows it to be folded around a midline with apertures for the in-line to the valve, the outline from the valve, and the valve stem. These apertures are sealed by removable gaskets making the invention fluid tight. The membrane can be made of a clear material or have a panel of clear material for observing the accumulation of seepage in the invention. A drain plug is also provided for removing accumulated seepage.

Before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the concept upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is, therefore, an object of the present invention to provide a new and improved containment apparatus for valve or fitting seepage which may be easily and efficiently manufactured and marketed.

It is a further object of the present invention to provide a new and improved containment apparatus for valve or fitting seepage which is of a durable and reliable construction.

An even further object of the present invention is to provide a new and improved containment apparatus for valve or fitting seepage which is attainable to the consuming industry at low prices of sale, thereby making such apparatus economically available to the pipeline industry.

Still another object of the present invention is to provide a new and improved containment apparatus for valve or fitting seepage which provides some of the advantages of the prior art, while simultaneously overcoming some of the disadvantages normally associate therewith.

It is a further object of the present invention to provide an improved containment apparatus for valve or fitting seepage which allows for ease of installation and disassembling for access to the valve with no training required for user personnel.

An even further object of the preset invention is to allow use of a containment apparatus for valve or fitting seepage in tight quarters where access to the valve assembly is limited and installation and disassembling doesn't disrupt pipeline flow.

Still another object of the present invention is to provide a new and improved containment apparatus for valve or fitting seepage which allows for visual inspection of the valve and accumulation of the seepage.

Another object of the present invention is to provide an improved containment apparatus for valve or fitting seepage which allows for proper disposal of the seepage without need of disassembling the invention.

A further object of the present invention is to provide an improved containment apparatus for valve or fitting seepage which easily accommodates various size valves and fittings and the related diameter pipelines.

A further object of the present invention is to provide an improved containment apparatus for valve or fittings seepage which will enclose a fitting and would have a pair of openings to accommodate a fitting.

It is a further object of the present invention to provide an improved containment apparatus for fittings and pipes which are attached at any variable angle or angles.

It is a further object of the present invention to provide an improved containment apparatus to contain a leak or seepage anywhere along a pipe system.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

DETAILED DESCRIPTION OF THE PREFERRED EMBODIMENTS

Figure 1:
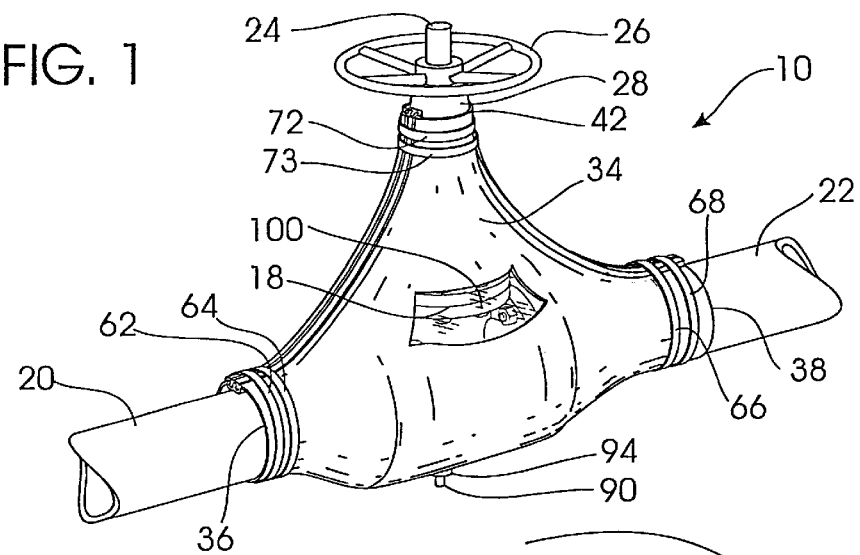
FIG. 1 is a perspective view illustration of an exemplary embodiment of a flexible fluid containment system constructed in accordance with the present invention operatively attached to a pipeline valve assembly.
Figure 2:
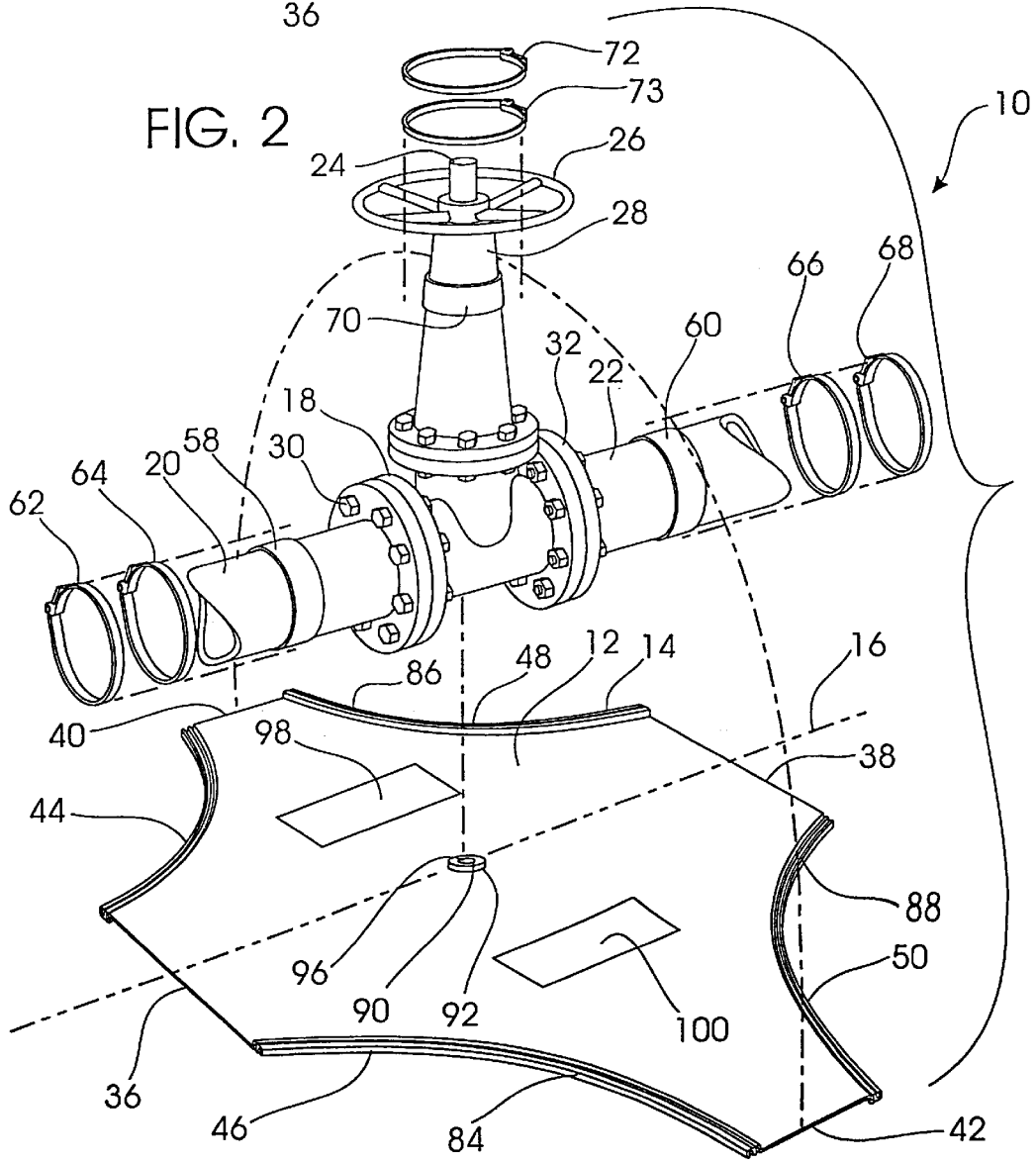
FIG. 2 is an exploded perspective view representation of the invention shown in FIG. 1 exploded to show the relationship of parts and order of assembly of the various parts.
Figure 3:
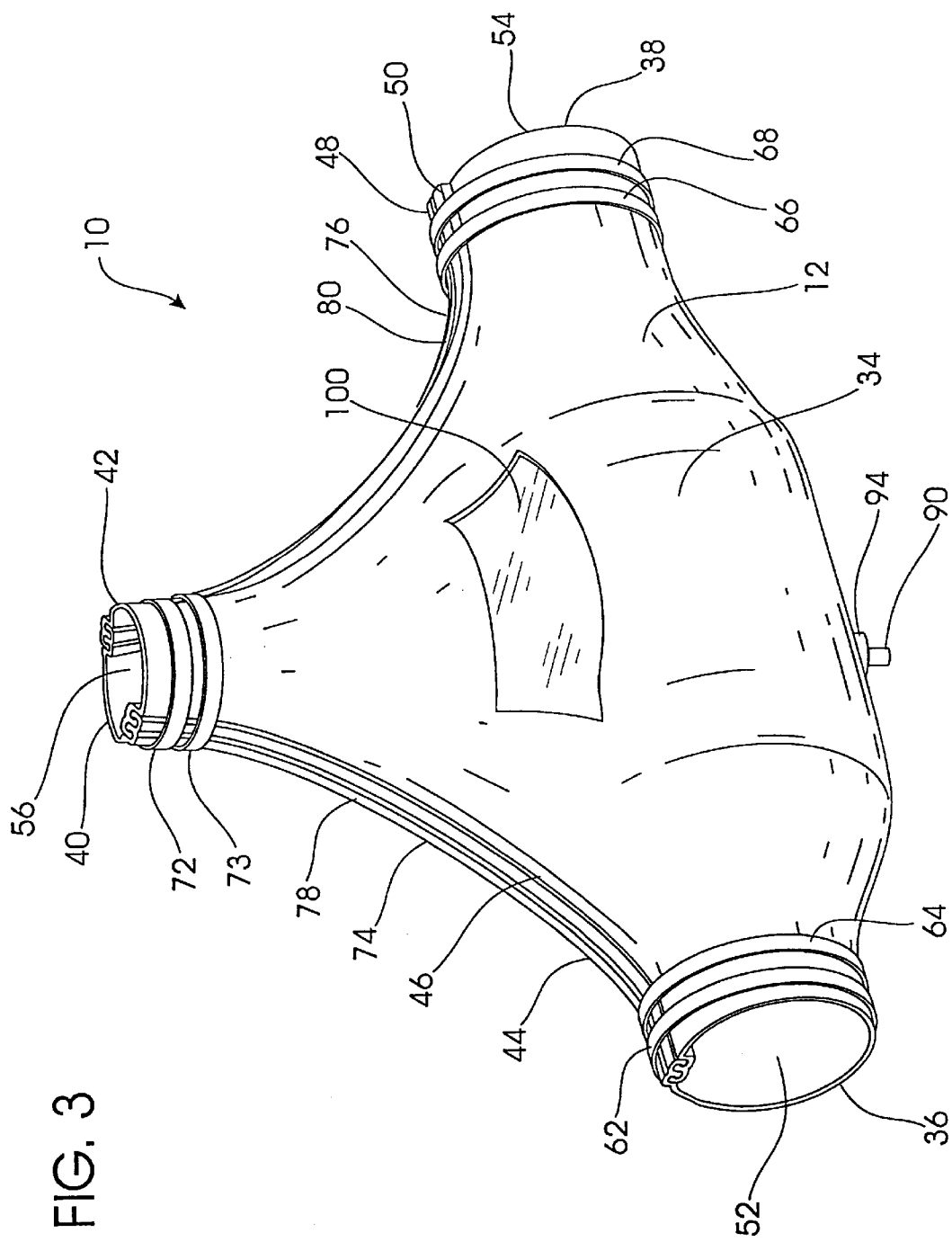
FIG. 3 is a perspective view illustration of an exemplary embodiment of the present invention apart from the pipeline valve assembly.

In accordance with an exemplary embodiment of the present invention as shown in FIGS. 1, 2 and 3 of the drawings, reference character 10 generally designates a new and improved flexible fluid containment system for valve or pipe fitting seepage constructed in accordance with the present invention. The apparatus 10 includes a flexible membrane 12 with an outer edge 14 and a midline 16 generally centered down the length of the apparatus 10. The apparatus 10 generally folds over at the midline 16 to cover a pipeline valve 18 such as but not limited to industrial sized gate valves.

Components for atypical valve 18 installed in a pipeline system generally comprise an inline pipe 20, an outline pipe 22, a stem 24, a stem handle 26, and a yolk 28. Further components of valve 18 also generally comprise an in-line flange 30 for connecting valve 18 to in-line 20 and an outline flange 32 for connecting valve 18 to outline 22. Valve 18 and its components are not specifically related to the improvements which constitutes the invention of this disclosure but are illustrated and described only to give a general background to which the invention is applicable. It is understood that in practice of the apparatus 10 the shape and configuration of valve 18 and its components can vary considerably and may have physical appearances that are completely unlike that illustrated in the drawings.

Membrane 12 is preferably constructed from a fuel resistant, flexible, and ultraviolet resistant material such as but not limited to polyurethane. A preferred embodiment of membrane 12 is a clear polyurethane material to be relatively transparent although opaque material may be utilized, but is not limited to transparent materials.

Outer edge 14 of membrane 12 is generally contoured to form a container 34 for containment of valve 18 seepage when the apparatus 10 is fully assembled. Outer edge 14 generally comprises a first section 36, a second section 38, a third section 40, a fourth section 42, a fifth section 44, a sixth section 46, a seventh section 48, and an eighth section 50.

When membrane 12 is folded about midline 16, the outer edge 14 first section 36 generally forms a first aperture 52 and second section 38 forms a second aperture 54. First aperture 52 allows the membrane 12 to generally close around inline pipe 20. Second aperture 54 allows the membrane 12 to generally close around outline pipe 22.

Also when membrane 12 is folded about midline 16, outer edge 14, third section 40, and fourth section 42 generally join creating a third aperture 56 for fitting around stem 24.

To close first aperture 52 around in-line 20 and second aperture 54 around outline 22, a preferred method uses a removably fitted gasket 58 and 60 respectively to form a generally leak proof seal. Gasket 58 and 60 essentially comprise a piece of soft material such as but not limited to fuel resistant lubber or synthetic material which allow the membrane 12 to be trapped between the gasket and a removable clamping means. A preferred embodiment of clamp is adjustable metal straps 62, 64, 66, and 68 that have a screw mechanism for tightening and loosening with a screwdriver. Another preferred embodiment uses pairs of straps on each gasket.

The membrane 12 outer edge 14, first section 36, and second section 38 may also be sealed on in-line flange 30 and outline flange 32, respectively.

Third aperture 56 is likewise preferably generally sealed around stem 24 with a removable gasket 70 and straps 72 and 73. A preferred embodiment allows stem 24 to still operate with apparatus 10 in place. Still another preferred embodiment places removable gasket 70 around the yolk 28 of stem 30.

Membrane 12 outer edge 14 is preferably constructed so that fifth section 44 removably joins sixth section 46 and seventh section 48 removably joins eighth section 50 when membrane 12 is generally folded about midline 16 over valve 18 creating seams 74 and 76 respectively. Preferred embodiments of sealing seam 74 and 76 include but are not limited to heat sealing, adhesives, staples or other such joining devices. A preferred embodiment allows for removably joining seams 74 and 76 with a zipper device such as but not limited to a zipper 78 and 80 where fifth section 44 male lining 82 matingly removably engages sixth section 46 female lining 84 and seventh section 48 male lining 86 matingly removably engages eighth section 50 female lining 88. A preferred embodiment of zipper material is ridges constructed from such material as polyurethane.

Referring to FIGS. 2 and 3 in particular, reference character 90 designates a drain plug for draining seepage without removal of the entire apparatus 10. Drain plug 90 is generally located on midline 16 of membrane 12. A preferred embodiment of drain plug 90 is a stopcock which attaches to membrane 12 with washers 92 and 94 and nut 96 on both sides of membrane 12 to secure a liquid proof seal where the stopcock penetrates membrane 12.

Another preferred embodiment of apparatus 10 is an observation port 98 constructed of a clear material when membrane 12 is not constructed of a clear material. Observation port 98 is preferably generally located on membrane 12 for viewing seepage which may have accumulated in the apparatus 10. Another preferred embodiment may provide a second observation port 100.

In operation, the apparatus may be installed with taking the pipeline or valve out of service. Apparatus 10 is placed over valve 18 in the field with midline 16 generally lining along with in-line 20 and outline 22. Membrane 12 is folded generally along midline 12 so that outer edges 14 join. Fifth section 44 is matingly joined with sixth section 46 forming a liquid proof seam 74 between inline line 20 and stem 24. Seventh section 48 is likewise matingly joined with eighth section 50 forming a liquid proof seam 76 between outline 22 and stem 24.

Gasket 58 is generally placed around in-line 20 and membrane 12 outer edge first section 36 is secured to gasket 58 with straps 62 and 64. Straps 62 and 64 are tightened to form a liquid proof seal closing aperture 52.

Gasket 60 is generally placed around outline 22 and membrane 12 outer edge 14 second section 38 is secured to gasket 60 with straps 66 and 68. Straps 66 and 68 are tightened to form a liquid proof seal closing aperture 54.

Gasket 70 is placed generally around stem yolk 28 and membrane 12 outer edge 14 third section 40 and fourth section 42 are secured to gasket 70 with strap 72. Strap 72 is tightened to form a liquid proof seal closing aperture 56.

To inspect accumulation of seepage, user peers through observation port 98 or 100. To drain seepage without removing apparatus 10, drain plug 90 is opened.

To remove apparatus 10, straps 62,64,66,68, and 70 are removed. Seams 74 and 76 are undone and membrane 12 is removed from valve 18.

The present invention has uses in other fluid containment applications such as to control and contain seepage from pipe fittings. Where a containment apparatus is used with a pipe fitting, there would be a pair of openings, rather than the three illustrated in the previous embodiment. A single zipper would extend between the openings.

The present invention also will accommodate both valves and fittings that are attached at a variable angle or at variable angles.

Finally, the present invention might be utilized to contain a leak anywhere along a pipe system.

Thus, it will be appreciated that as a result of the present invention, a new and improved flexible fluid containment system for valve and fitting seepage is provided by which the principal objective, among others, is completely fulfilled. Changes may be made in the combinations, operations, and arrangements of the various parts and elements described herein without departing from the spirit and scope of the invention as defined in the following claims.

What is claimed is:

1. A flexible fluid containment apparatus for a valve assembly having at least an in-line pipe, an outline pipe and a stem, which apparatus comprises:
   a gasket adapted to surround said in-line pipe, a gasket adapted to surround said outline pipes and a gasket adapted to surround said stem;
   a one-piece flexible membrane shaped to surround said valve assembly with an aperture around said in-line pipe, an aperture around said outline pipe and an aperture around said stem;
   at least one zipper between said in-line pipe aperture and said outline pipe aperture; and
   a clamp surrounding said membrane at each said gasket.

2. A removable containment apparatus for containing pipeline valve seepage comprising: a one piece foldable leak proof membrane with an outer edge contoured to form a container about a pipeline valve when said membrane is folded about a midline and over the pipeline valve, said one piece membrane having:
   a first section on said edge on said membrane which forms an aperture for an in-line to said valve when said membrane is folded;
   a second section on said edge on said membrane which forms an aperture for an outline from said valve when said membrane is folded;
   a third section and fourth section on said edge on said membrane which join and form an aperture for a stem on said valve when said membrane is folded;
   a fifth section and sixth section on said edge of said membrane which join, forming a seam between said in-line and said stem;
   a seventh section and eighth section on said edge of said membrane which join, forming a seam between said outline and said stem; and
   means for removably sealing said first section to said in-line, said second section to said outline, said third section and said fourth section to said valve stem, said fifth section and said sixth section to one another, and said seventh section and said eighth section to one another.

3. The removable containment apparatus as recited in claim 2 wherein said one piece membrane is symmetrical and said midline passes through the center of each of said first section and said second section and separates said third, fifth, and seventh sections from said fourth, sixth, and eighth sections.

4. The removable containment apparatus as recited in claim 3, wherein said fifth and sixth sections and said seventh and eighth sections are selectively joined by zippers with zipper halves located along the edges thereof.

5. The removable containment apparatus as recited in claim 3, further comprising a drain.

6. The removable containment apparatus as recited in claim 3 wherein said one piece membrane is a fuel resistant polyurethane.

7. The removable containment apparatus as recited in claim 6 wherein said membrane has a view port for observing said pipeline valve seepage.

8. The removable containment apparatus as recited in claim 3 wherein said membrane is made from a see through material for observing said pipeline valve seepage.

9. The removable containment apparatus as recited in claim 8 wherein said see through material is a fuel resistant polyurethane.

10. The removable containment apparatus as recited in claim 9 wherein said polyurethane is ultraviolet resistant.

11. The removable containment apparatus as recited in claim 3 wherein said means for sealing said first section to said in-line, said second section to said outline, and said third section and said fourth section to said valve stem comprise banding with a fuel resistant gasket.

12. The removable containment apparatus as recited in claim 11 wherein said fuel resistant gasket is rubber.

13. A method of preventing inadvertent contamination from pipeline valve seepage for a pipeline valve having an in-line, an outline, and a stem comprising the steps of:

placing a gasket on said pipeline valve in-line, outline, and stem respectively, placing over said valve, said in-line, and said outline a one piece foldable leak proof membrane with an outer edge contoured to form a container about said pipeline valve when said membrane is folded about a midline, said membrane having:
- a first section on said edge on said membrane which forms an aperture for an in-line to said valve when said membrane is folded,
- a second section on said edge on said membrane which forms an aperture for an outline from said valve when said membrane is folded,
- a third section and fourth section on said edge on said membrane which join and form an aperture for a stem on said valve when said membrane is folded,
- a fifth section and sixth section on said edge of said membrane which join forming a seam between said in-line and said stem,
- a seventh section and eighth section on said edge of said membrane which join forming a seam between said outline and said stem, section to one another, clamping said first section of said edge of said membrane to said gasket on said in-line forming a liquid proof seal, clamping said second section of said edge of said membrane to said gasket on said outline forming a liquid proof seal, clamping said third section and said forth section of said edge of said membrane to said gasket on said stem forming a liquid proof seal, sealing said fifth section and said sixth section to one another forming a liquid proof seal between said in-line and said stem, and sealing said seventh section and said eighth section to one another forming a liquid proof seal between said outline and said stem.

\* \* \* \* \*